3,766,226
PEANUT BUTTER STABILIZER
Chester Martin Gooding, Westfield, Wilbur Parker, Somerville, and Daniel Melnick, West Englewood, N.J., assignors to CPC International Inc.
No Drawing. Original application June 30, 1969, Ser. No. 837,862, now Patent No. 3,671,267. Divided and this application Mar. 27, 1972, Ser. No. 238,678
Int. Cl. C07c 53/00; C11b 5/00
U.S. Cl. 260—398.5                                    16 Claims

ABSTRACT OF THE DISCLOSURE

A novel peanut butter stabilizer for providing improved peanut butter, for example, a peanut butter of improved mouth feel and low temperature spreadability, stabilized aginst oil separation at temperatures up to about 100° F. with from about 0.5% to about 2.3% of a symmetrical monounsaturated disaturated glyceride, from about 0.35% to about 1.3% of a trisaturated glyceride, and no more than about 2% total of a diunsaturated monosaturated glyceride and/or unsymmetrical monosaturated disaturated glyceride, the percentage figures being percent by weight.

---

This is a division of application Ser. No. 837,862 filed June 30, 1969, now Pat. No. 3,671,267.

This invention relates to a stabilizer for peanut butter to provide peanut butter of improved mouth feel and low temperature spreadability.

Peanut buttter of the prior art consists essentially of ground roasted peanuts, sugar (dextrose and/or sucrose), and salt. Because this product exhibits gravitational instability (oil layer separating on top of the product) it has become regular practice to add a relatively high melting fat component to the hot (about 170° F.) peanut butter prior to the filling of the product into jars. This high melting fat component usually has a melting point in excess of 110° F. but less than 160° F. and may be: a partially hydrogenated fat, a completely hydrogenated fat, monoglyceride and diglyceride esters of the saturated fatty acids, or mixtures of these stabilizing agents.

These high melting fat components, when added in small amounts (viz. 1–3% of the peanut butter), may be introduced as a supplement to the ground roasted peanuts or when added in larger amounts (viz. 5–10% of the peanut butter), may be introduced after an equivalent amount of the liquid peanut oil in the ground roasted peanuts has been removed. The added hard fat sets up as a continuous or semi-continuous structure within the final peanut butter during the cooling of the product and in so doing prevents oil from separating from the peanut butter. The sugar and salt flavorings are added in the peanut butter manufactured in total amounts usually less than 5% and this addition may be balanced if desired with an equivalent addition by weight of liquid non-hydrogenated vegetable oil or the stabilizing agent previously mentioned. During the roasting of the peanuts, the moisture content is reduced so that the final product will contain less than 4% moisture.

Oil separation can easily be prevented by the use of a sufficient amount of a sompletely saturated fat or other stabilizer. This, however, leads to a sacrifice of low temperature spreadibility and the development of waxy mouthing properties. The delicate balance required to prevent oil separation without sacrificing too much low temperature spreadability and incurring too waxy mouthing properties is difficult of attainment and almost impossible to maintain in the day-to-day manufacture of the peanut butter.

The well-known determination of solids content index (S.C.I.) applied to the extracted fat from heated peanut butters provides a good method for correlating the spreadability and stability of peanut butters with the amounts and kinds of stabilizers used in the peanut butters. The S.C.I. of the fat may be determined by the dilatometric method described by Fulton et al. (J.A.O.C.S., 31, 98, 1954). The less solids a fat contains at 50° F., the more spreadable is the peanut butter containing the fat. On the other hand, there must still be a sufficient solid fat content at 100° F. if oil separation is to be avoided. Thus, the higher the S.C.I. values at about 100° F., the better is the tendency of the peanut butter containing the oil to resist oil separation.

The typical peanut butters of industry include as stabilizers, either: (1), fat hydrogenated to near saturation; (2), small amounts of mono- and diglycerides; or (3), partially hydrogenated fats, generally partially hydrogenated vegetable oils. Table I shows typical S.C.I.'s of oil separated from peanut butters using the three stabilizers.

TABLE I

| Stabilizer | Melting point of oil-stabilizer combination | Solids content index at— | | | | |
|---|---|---|---|---|---|---|
| | | 50° F. | 70° F. | 80° F. | 92° F. | 102° F. |
| Fat hydrogenated to near saturation | 118 | 5.6 | 5.5 | 5.4 | 5.4 | 4.7 |
| Small amount of mono- and diglycerides | 112 | 4.0 | 3.7 | 3.7 | 3.6 | (*) |
| Partially hydrogenated peanut oil | 95 | 8.3 | 5.4 | 3.4 | 2.1 | 0.3 |

*Not determined.

Examination of the table indicates that peanut butter stabilized with a saturated fat stabilizer has high resistance to oil separation. The disadvantage of the saturated fat stabilized peanut butters are that the high melting point of the fat and the high solids content at 102° F. detracts from the mouthing characteristics of the peanut butter product.

The peanut butter stabilized by the addition of small amounts of mono- and diglycerides is somewhat better in that it has acceptable spreadability and resistance to oil separation. However, the fat phase is still of relatively high melting point and thus does not impart optimum non-waxy mouthing properties.

The peanut butter stabilized with partially hydrogenated peanut oil has adequate resistance to oil separation at moderate temperatures and good mouthing properties but exhibits greatly decreased spreadability at 50° F. Also, it tends to separate oil at temperatures near the melting point of the fat phase. Furthermore, when these peanut butters are exposed to temperatures above the melting point of the fat phase, they resolidify upon cooling to an objectionably firm product.

An object of the invention is to improve the spreadability of peanut butter at temperature in the region of 50° F.

Another object of the invention is to achieve cold spreadability without incurring unsightly oil separation at room temperature and to extend resistance to oil separation from peanut butter into a range of temperatures commonly encountered under adverse warehousing during summer or use of the peanut butter in warm climates.

Still another object is to avoid objectionable waxy mouthing properties which are associated with peanut butters stabilized to an extent which prevents oil separation at elevated storage temperatures.

Yet another object of the invention is to provide an improved peanut butter stabilized against oil separation with from about 0.5% to about 2.3% of a symmetrical monounsaturated disaturated glyceride, from about 0.35% to about 1.3% of a trisaturated glyceride, and no more than about 2% total of diunsaturated monosaturated glyceride and/or unsymmetrical monounsaturated disaturated glyceride.

A still further object of the invention is to provide a process for preparing a stabilizer for use in peanut butter which will accomplish the above objects.

Other objects will appear hereinafter from the description which follows and from the appended claims.

GENERAL DESCRIPTION OF THE INVENTION

An ideal peanut butter stabilizer would have relatively low solids content at 50° F. and retain a good proportion of that solids content at 100° F. It would have non-waxy mouthing characteristics, be spreadable at low temperatures, and resist oil separation. We have found, surprisingly, that a peanut butter with all of these desired characteristics can be obtained using a particular hydrogenated fat as a stabilizer. The stabilizer must contribute to a peanut butter from about 0.5% to about 2.3% of a symmetrical monounsaturated disaturated glyceride, from about 0.35% to about 1.3% of a trisaturated glyceride, and no more than about 2% total of diunsaturated monosaturated glyceric and/or unsymmetrical monounsaturated disaturated glyceride, the percentage figures being percent by weight of the peanut butter.

For convenience in discussion, unsaturated fatty acids will hereafter be referred to as U and saturated fatty acids as S with the number of fatty acids per glyceride being represented as subscripts. The letter G will be used to represent a glyceride residue. For example, a glyceride containing two unsaturated fatty acids and one saturated fatty acid will hereafter be referred to as $U_2SG$.

The stabilizer may be produced in any of several ways. For example, we have found that at least 70% of a conventional partially hydrogenated peanut oil stabilizer performs no useful function in peanut butter. When this 70% of the partially hydrogenated peanut butter oil stabilizer is removed, the remaining 30% of the stabilizer will prevent separation of the oil from the peanut butter. The removal of the ineffective 70% of the partially hydrogenated peanut oil stabilizer also leads to a marked reduction in the value of the S.C.I. at 50° F.

It is preferred, when making the stabilizer described in the preceeding paragraph, to partially hydrogenate the peanut oil to have an iodine value (I.V.) of from about 30 to 60 and a melting point of from about 105° F. to about 130° F.

The stabilizing 30% of partially hydrogenated peanut oil may be recovered by crystallization from acetone, isopropyl alcohol, ethanol, or other solvents or mixtures of solvents in which the hydrogenated oil is sparingly soluble. With acetone, for example, this is accomplished by heating acetone and the oil in a ratio of from about 3 parts to about 12 parts acetone for each part of oil, the parts figures being parts by weight, to a temperature of from about 100° F. to about the boiling point of the solution. The solution is then cooled to room temperature (generally from about 65° F. to about 75° F.) and maintained at the lower temperature until crystallization occurs. The crystals are the effective 30% of the stabilizer. The remaining 70% of the stabilizer remains in solution in the acetone.

The S.C.I. of both a crystalline phase and an acetone soluble phase produced as just described, after recovery from the acetone, were determined. Table II presents the results of this determination.

TABLE II

| Portion of partially hydrogenated peanut oil | Solids content index at— | | | | | |
|---|---|---|---|---|---|---|
| | 50° F. | 70° F. | 80° F. | 92° F. | 102° F. | 110° F. |
| 4.8% solution of crystalline fraction in peanut oil | 5.5 | 3.7 | 3.5 | 2.2 | 1.2 | 0.6 |
| 11.2% solution of acetone soluble fraction in peanut oil | 4.3 | 0.8 | 0.2 | 0.2 | 0.5 | 0.4 |
| Peanut oil from roasted ground peanuts | 1.6 | 0.0 | 0.0 | 0.0 | 0.0 | |

In normal practice, peanut butter contains about 16% of partially hydrogenated peanut oil, in its oil phase. The data in Table II wherein this 16% has been fractionated into an effective 4.8% and an ineffective 11.2% clearly demonstrate that the acetone soluble fraction does not contribute greatly to preventing oil separation. The very high S.C.I. found at 50° F. for the acetone soluble fraction demonstrate that this fraction has a large deterrent effect upon the spreadability of peanut butter at this temperature. The final line of data in the table, relating to the peanut oil itself, demonstrates that while peanut oil does somewhat reduce the spreadability of the peanut butter at 50° F., the acetone soluble fraction of the stabilizer has a far greater effect at this temperature.

It has further been discovered that the major part of the partially hydrogenated peanut oil stabilizer, that portion which does not crystallize from acetone, is composed of $U_2SG$'s and unsymmetrical $US_2G$'s. Thus, to prevent lack of spreadability at 50° F., it is necessary to maintain the total $U_2SG$ and/or unsymmetrical $US_2G$ content of peanut butter at no more than about 2%. More preferably, the total $U_2SG$ and/or unsymmetrical $US_2G$ content is below about 1.3%.

The crystallizable portion of the partially hydrogenated peanut oil stabilizer was found to contain $S_3G$'s and symmetrical $US_2G$'s. The unsaturated acids in the crystallized fraction were found to be primarily trans in configuration; that is they were elaidic and other iso-oleic acids. The ratio of $US_2G$ to $S_3G$ in the acetone crystallized fraction was roughly 3 to 1. The $US_2G$ was symmetrical $US_2G$. That is, the unsaturated acid was esterified with the central (2) carbon of glycerol and the saturated acids were each esterified with the end (1 and 3) carbons of glycerol.

The solution of the problem presented by the desire to improve the spreadability and mouth feel of peanut butter therefore consists of supplying a stabilizer which is high in symmetrical $US_2G$, has a controlled amount of $S_3G$, and is low in $U_2SG$ and/or unsymmetrical $US_2G$. The preferred ratios of symmetrical $US_2G:S_3G$:total $U_2SG$ and/or unsymmetrical $US_2G$ fall within the ranges of 0.5 to 7 parts $US_2G$:1 part $S_3G$:less than 6 parts $U_2SG$ and/or unsymmetrical $US_2G$, the parts being parts by weight. The most preferred ratios of symmetrical $US_2G:S_3G$:total $U_2SG$ and/or unsymmetrical $US_2G$ fall within the ranges of 0.7 to 1.7 parts $US_2G$:1 part $S_3G$:less than about 2 parts total $U_2SG$ and/or unsymmetrical $US_2G$. Preferably from about 1.8% to about 5% of stabilizer is used in making peanut butter. Most preferably from about 2% to about 3% of stabilizer is used.

Expressed in another way, the problem is solved by using a stabilizer which contributes to a peanut butter from about 0.5% to about 2.3% of a symmetrical $US_2G$, from about 0.35% to about 1.3% of a $S_3G$, and no more than about 2% total of $U_2SG$ and/or unsymmetrical $US_2G$, the percentage figures being percent by weight of the peanut butter. More preferably, the stabilizer contributes 0.8% to 1.2% of a symmetrical $US_2G$, 0.6% to 1.1% of a $S_3G$, and no more than about 1.3% of $U_2SG$ and/or unsymmetrical $US_2G$.

It is preferred that any fat converted into a stabilizer should be a non-lauric fat. Lauric acid is a $C_{12}$ acid and is therefore much lower in melting point than the usual $C_{16}$ to $C_{20}$ acids occurring in glyceride oils. Most preferably, the lauric acid content of the glyceride oil which is to be converted into a stabilizer is less than about 2% by weight of the oil.

A usable stabilizer of desirable properties may be produced from partially hydrogenated peanut oil or any non-lauric polyunsaturated fat as just described. However, the sole requirement for the stabilizer is that it be rich in symmetrical $US_2G$, have a controlled amount of $S_3G$, and be low in $U_2SG$ and/or unsymmetrical $US_2G$. Particularly useful in the practice of the invention are fats which naturally contain as a major part of their compositions, symmetrical $US_2G$'s. Among fats of this type are cottonseed stearine, palm oil; and, as well, cocoa butter, shea nut butter, illipe nut butter and the like, and mixtures thereof. While the latter three fats are ideally suited to the preparation of symmetrical $US_2G$'s they are ordinarily too expensive to consider when much less expensive oils are available.

An advantage gained when using the listed five oils, and the like, is that no separation step is required because hydrogenation of these fats leads to a product which has the required amounts of symmetrical $US_2G$ and is sufficiently low in total $U_2SG$ and/or unsymmetrical $US_2G$ content. If a more concentrated stabilizer is desired, a separation step may, of course, be performed.

In the hydrogenation of the fats being converted into the stabilizers of this invention, selective conditions of hydrogenation should preferably be employed. Under such conditions there occurs hydrogenation of the fatty acids containing active methylene groups (linoleic) in preference to acids devoid of such groups (oleic). The selective hydrogenation is continued until substantially all $U_2SG$ in the fat is converted into $US_2G$ and $S_3G$. The lower the temperature, the more non-selective will be the hydrogenation, while the higher the temperature the more selective it will be. We contemplate employing hydrogenation temperatures in excess of 260° F., and preferably between 300° F. and 400° F., in preparing the hydrogenated components used as our peanut butter stabilizers.

An illustration of how the stabilizer prepared from cottonseed stearine is used will be useful in understanding the increased utility of symmetrical $US_2G$ in peanut butter as compared with much larger quantities of stabilizer prepared by partial hydrogenation of peanut oil. Table III presents the S.C.I. data for peanut oil to which partially hydrogenated cottonseed stearine has been added in different amounts by weight.

TABLE III

| Peanut oil | Partially hydrogenated cottonseed stearine | Solids content index at— | | | | |
|---|---|---|---|---|---|---|
| | | 50° F. | 70° F. | 80° F. | 92° F. | 102° F. |
| 100 | 8 | 4.5 | 3.5 | 2.8 | 1.7 | 0.8 |
| 100 | 7 | 4.8 | 3.5 | 2.4 | 1.6 | 0.1 |
| 100 | 6 | 3.3 | 2.5 | 1.9 | 1.0 | 0.0 |

The data in Table III indicate that about 10% of the cottonseed stearine based on peanut oil weight will contribute sufficient solids to stabilize adequately peanut butter without incurring excessive and objectionable solids at 50° F. This is equivalent to about 5% stabilizer in peanut butter which is about 50% solids and 50% oil. Furthermore, the small but desirable increased solids at 102° F. would provide adequate resistance to oil separation.

The stabilizer produced from cottonseed stearine is usable for stabilizing peanut butter as revealed in this invention. The $S_3G$ content of the cottonseed stearine derived stabilizer is however in the lower portion of the range disclosed. For this reason a fairly large amount of this particular stabilizer, about 5% by weight based on peanut butter, must be used. The blending of a substantially fully hydrogenated fat very high in $S_3G$, content with the cottonseed stearine stabilizer produces a blended stabilizer which can be used in lesser quantity.

Any mixtures or blends of fats which produce symmetrical $US_2G$, $S_3G$ and sufficiently low total $U_2SG$ and/or unsymmetrical $US_2G$ contents are also usable in the practice of the invention.

A preferred stabilizer has a melting point in the range from about 125° F. to about 140° F. and exhibits an I.V. of from about 20 to about 30.

In one particularly preferred embodiment of the invention, partially selectively hydrogenated cottonseed stearine and essentially fully hydrogenated peanut oil in the ratio of about 2.5 to 1 are mixed to form a stabilizer composition in which the ratio of symmetrical $US_2G$:$S_3G$:total $U_2SG$ and/or symmetrical $US_2G$ is 3:1:no more than about 2.

The preferred hydrogenated cottonseed stearine and hydrogenated peanut oil for use in making a blended stabilizer using these components are cottonseed stearine hydrogenated to a melting point of from about 125° F. to about 135° F. and to an I.V. of 30–40 and peanut oil hydrogenated to a melting point of from about 140° F. to about 155° F. and having an I.V. of from about 0 to about 6. Alternatively, cottonseed stearine may be hydrogenated to provide a higher $S_3G$ content derived from the cottonseed stearine itself rather than from the addition of hydrogenated peanut oil.

When the stabilizer is blended with peanut butter to form a uniformly distributed stabilized composition it is necessary that the stabilizer is in liquid form. This can be accomplished by any convenient technique for example, by admixing the peanut butter and the stabilizer at a temperature above the melting point of the stabilizer. Alternatively, a portion of the peanut oil may be removed from the peanut butter, the stabilizer can be dissolved in the oil, and the resulting solution can be blended with the remainder of the peanut butter. Other techniques known in the peanut butter art may likewise be employed.

The following example illustrates a typical preparation of the improved peanut butter of the inventtion. The example is meant to be illustrative and the invention, of course, is not to be limited thereto. Percentages expressed below are in terms of weight percent unless otherwise indicated.

EXAMPLE

Preparation of stabilizer and peanut butter

Cottonseed stearine with an I.V. of 87.4 and a melting point of 88° F., produced by chilling cottonseed oil, filtering it, and collecting the solid cottonseed stearine, was selectively hydrogenated at 385° F. and 15 p.s.i.g. using a nickel catalyst to obtain a hydrogenated product with a melting point of 129.6° F. and an I.V. of 35.2.

This served to convert essentially all of the polyunsaturated acids originally present in the cottonseed stearine to monounsaturated acids.

A sample of peanut oil was almost completely hydrogenated at 350° F. and 20 p.s.i.g. to a melting point of 145° F. and an iodine value of 4.5.

The hydrogenated peanut oil and the selectively hydrogenated cottonseed stearine were blended in the ratio of 2½ parts cottonseed stearine to 1 part of peanut oil. This produced a stabilizer blend. The stabilizer blend had a melting point of 136° F. and an I.V. of 24.5.

The stabilizer blend (2.5%) was admixed with seasoning agents, i.e. dextrose, salt, and sucrose, and the remainder, over 90%, ground roasted peanuts. The production of the peanut butter was performed in a conventional industrial peanut butter manufacturing facility. Over 60 pounds of peanut butter were produced per minute of operation.

The spreadability of the peanut butter was excellent at 50° F. No oil separation was noted at 100° F. The peanut butter had excellent non-waxy mouthing characteristics.

The S.C.I. of peanut oil extracted from the peanut butter was determined. Table IV presents the results of this determination.

TABLE IV.—PEANUT OIL SEPARATED FROM STABILIZED PEANUT BUTTER

Solids content index

| | |
|---|---|
| 50° F. | 3.8 |
| 70° F. | 2.5 |
| 80° F. | 2.1 |
| 92° F. | 1.8 |
| 102° F. | 1.2 |

The S.C.I. profile of the peanut oil extracted from the stabilized peanut butter indicates that significant solids content are present at 102° F. while the solids content at 50° F. is not so high as to be objectionable.

The distribution of fatty acids in the stabilizer blend was determined. The blend was found to contain approximately 74.9% saturated acids, 24.3% oleic acid (unsaturated), and the remainder linoleic acid, palmitoleic acid, and unidentified constituents.

The 24.3% of unsaturated oleic acid, which as a result of the selective hydrogenation must exist as part of a symmetrical or unsymmetrical $US_2G$ would have to be associated with twice 24.3% or 48.6% of the saturated acids. Subtracting the 48.6% of the saturated acids which are incorporated in $US_2G$, from the 74.9% total saturated acids leaves 26.3% saturated acids which must exist in $S_3G$ form. The ratio of total $US_2G$ to $S_3G$ in the blend was approximately 3 to 1.

In a separate experiment, a 50 gram aliquot of the selectively hydrogenated cottonseed stearine was recrystallized from 500 ml. of acetone. About 43% of the aliquot formed crystals. This represented the $S_3G$ and the symmetrical $US_2G$. The remaining 57% consisted essentially of unsymmetrical $US_2G$, and, as well, $U_2SG$. This aliquot was discarded.

From the above described experiments it can be calculated that the 2.5% of total stabilizer blend contained approximately 0.9% symmetrical $US_2G$, 0.6% $S_3G$, and 1.0% unsymmetrical $US_2G$ and $U_2SG$.

While the invention has been described in connection with specific embodiments thereof, it will be understood that it is capable of further modification, and this application is intended to cover any variations, uses, or adaptation of the invention following, in general, the principles of the invention and including such departures from the present disclosure as come within known or customary practice in the art to which the invention pertains and as may be applied to the essential features hereinbefore set forth, and as fall within the scope of the invention.

That which is claimed is:

1. A composition useful for stabilizing a peannut butter to prevent oil separation without impairing the low temperature spreadability of the peanut butter or giving it a waxy mouth property comprising:
    a symmetrical monounsaturated disaturated glyceride, a trisaturated glyceride, and a glyceride selected from the group consisting of a diunsaturated monosaturated glyceride, an unsymmetrical monosaturated disaturated glyceride, and mixtures thereof in a ratio of 0.5–7 parts symmetrical monounsaturated disaturated glyceride:1 part trisaturated glyceride:a maximum of 6 parts unsymmetrical monounsaturated disaturated glyceride and/or diunsaturated monosaturated glyceride, the parts figures being parts by weight.

2. The composition as in claim 1 further characterized in that the glycerides are the selective hydrogenation product of a polyunsaturated fat selected from the group consisting of cottonseed stearine, palm oil, cocoa butter, shea nut butter, illipe nut butter, and mixtures thereof.

3. The composition as in claim 2 further characterized in that the fat is cottonseed stearine.

4. The composition as in claim 2 further characterized in that the fat is palm oil.

5. The composition as in claim 1 further characterized in that it is obtained by forming a blend of:
    peanut oil, hydrogenated to an iodine value of less than about 6 and a melting point within the range from about 140° F. to about 135° F.; and
    a selectively hydrogenated fat selected from the group consisting of a selectively hydrogenated cottonseed stearine and selectively hydrogenated palm oil, having an iodine value within the range from about 30 to about 40 and a melting point within the range from about 125° F. to about 135° F.

6. The composition as in claim 5 further characterized in that the blend has an iodine value within the range from about 20 to about 30 and a melting point within the range from about 125° F. to about 140° F.

7. A process for producing a stabilizer useful in preventing oil separation from peanut butter comprising:
    selectively hydrogenating a polyunsaturated fat selected from the group consisting of cottonseed stearine, palm oil, cocoa butter, shea nut butter, illipe nut butter, and mixtures thereof until substantially all of a diunsaturated monosaturated glyceride component of the fat is hydrogenated to form a monounsaturated disaturated glyceride and a trisaturated glyceride; and
    recovering the stabilizer.

8. The proces in accordance with claim 7 wherein the selective hydrogenation is performed at a temperature above about 260° F.

9. The process in accordance with claim 8 wherein the hydrogenation is terminated after the hydrogenated fat has an iodine value of from about 30 to about 40 and a melting point of from about 125° F. to about 135° F.

10. A process for producing a stabilizer useful in preventing oil separation from peanut butter comprising:
    selectively hydrogenating a polyunsaturated fat selected from the group consisting of cottonseed stearine, palm oil, cocoa butter, shea nut butter, illipe nut butter, and mixtures thereof until substantially all of a diunsaturated monosaturated glyceride component of the fat is hydrogenated to form a monosaturated disaturated glyceride and a trisaturated glyceride;
    forming a blend of the selectively hydrogenated fat and peanut oil, hydrogenated to an iodine value of less than about 6 and a melting point within the range from about 140° F. to about 155° F.; and
    recovering the stabilizer.

11. The process in accordance with claim 10 wherein the selective hydrogenation is performed at a temperature within the range from about 300° F. to about 400° F.

12. The process in accordance with claim 10 wherein the hydrogenation is terminated after the hydrogenated fat has an iodine value of from about 30 to about 40 and a melting point of from about 125° F. to about 135° F.

13. The process in accordance with claim 10 wherein the stabilizer has an iodine value of from about 20 to about 30 and a melting point from about 125° F. to about 140° F.

14. A process for producing a stabilizer useful in preventing oil separation from peanut butter comprising:
    partially hydrogenating peanut oil;
    crystallizing the partially hydrogenated peanut oil from a solvent in which it is sparingly soluble to produce the stabilizer in the form of crystals and a solution containing a solvent soluble portion of the partially hydrogenated peanut oil; and recovering the stabilizer.

15. The process in accordance with claim 14 wherein the peanut oil is partially hydrogenated to have an iodine value of from about 30 to about 60 and a melting point of from about 105° F. to about 130° F.

16. The process in accordance with claim 14 wherein the solvent is acetone and the crystallizing includes:

heating a composition containing the partially hydrogenated peanut oil and acetone in a ratio of from about 3 parts to about 12 parts acetone for each 1 part of oil, the parts figures being parts by weight, to a temperature within the range from about 100° F. to about the boiling point of the composition to form a solution;

cooling the solution to a lower temperature within the range from about 65° F. to about 75° F.; and maintaining the lower temperature until crystallization occurs.

References Cited

UNITED STATES PATENTS

| | | | |
|---|---|---|---|
| 3,671,267 | 6/1972 | Gooding | 99—128 |
| 3,353,964 | 11/1967 | Leiden | 99—118 |

ELBERT L. ROBERTS, Primary Examiner

U.S. Cl. X.R.

99—128; 260—398